Figure 4A:
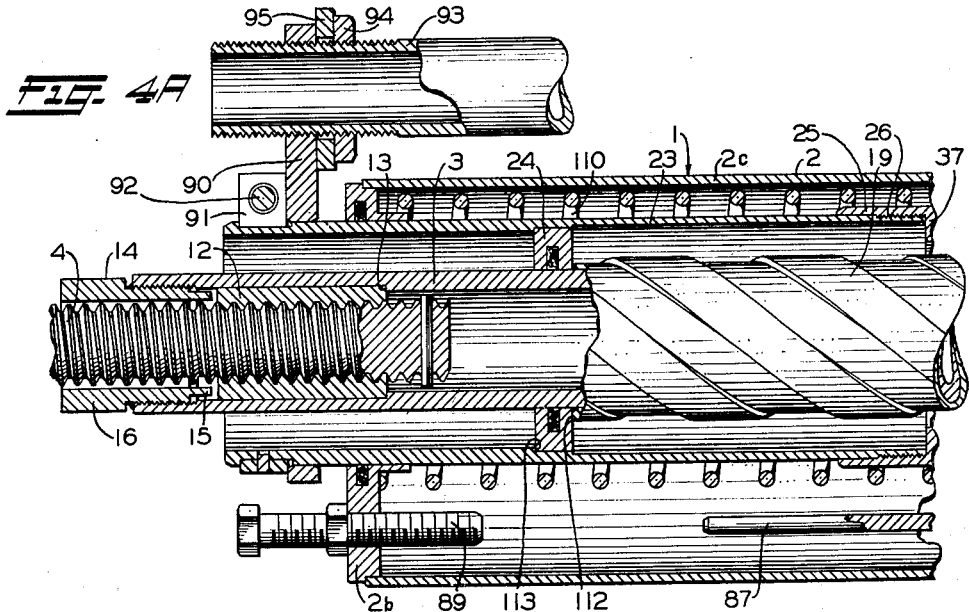

March 7, 1961    G. T. McCLURE ET AL    2,973,841
DOUBLE-ACTING MECHANICAL SLACK ADJUSTER
Filed Nov. 17, 1958    2 Sheets-Sheet 1
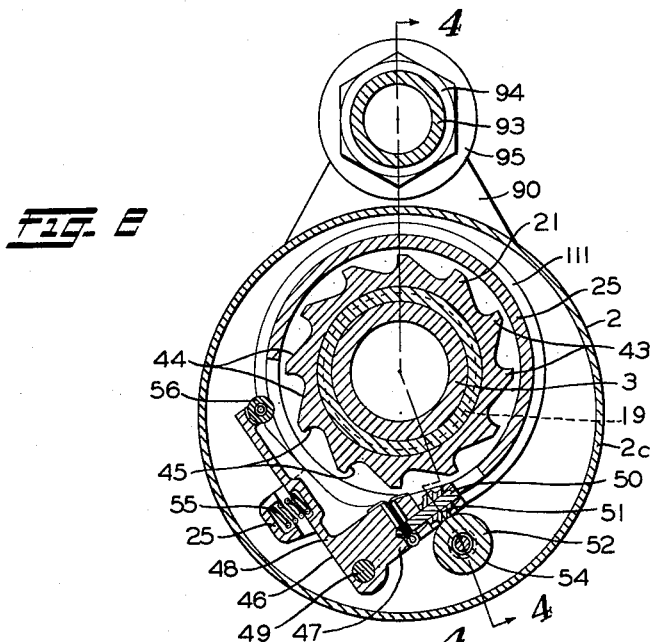
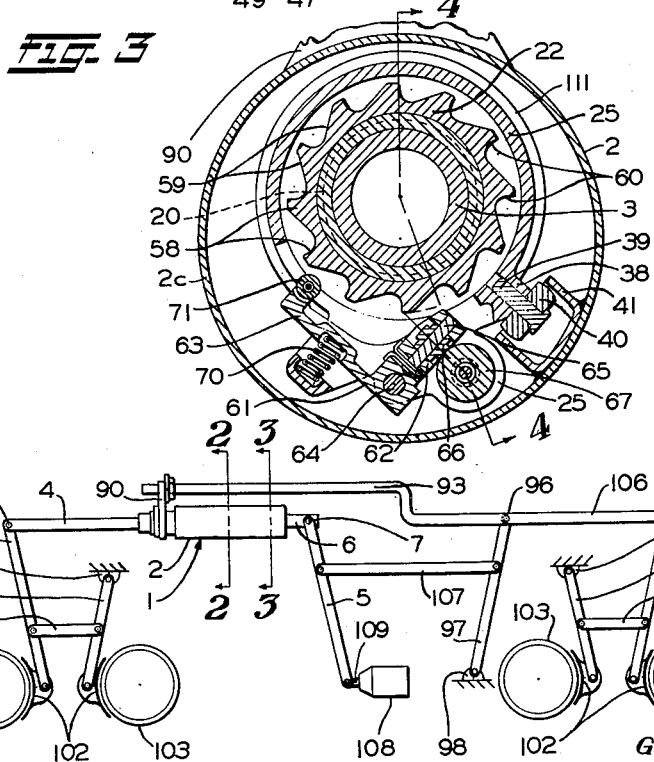
INVENTOR.
Glenn T. McClure
Thomas F. Hursen
BY
Adelbert A. Steinmiller
Attorney March 7, 1961   G. T. McCLURE ET AL   2,973,841
DOUBLE-ACTING MECHANICAL SLACK ADJUSTER
Filed Nov. 17, 1958   2 Sheets-Sheet 2

INVENTOR.
Glenn T. McClure
Thomas F. Hursen
BY
Adelbert A. Steinmiller
Attorney

United States Patent Office 2,973,841
Patented Mar. 7, 1961

2,973,841
DOUBLE ACTING MECHANICAL SLACK ADJUSTER

Glenn T. McClure, McKeesport, and Thomas F. Hursen, Monroeville, Pa., assignors to Westinghouse Air Brake Company, Wilmerding, Pa., a corporation of Pennsylvania Filed Nov. 17, 1958, Ser. No. 774,357

10 Claims. (Cl. 188—196)

This invention relates to brake rigging embodying slack adjusters and more particularly relates to an improved double-acting mechanically actuated slack adjuster automatically operative to take up or let out slack in the brake rigging of railway cars as may be necessary to maintain such slack within a desired range and also manually operable, when brakes are released, to adjust slack so as to facilitate replacement of worn brake shoes.

It has heretofore been proposed to provide, in slack adjusters of the above general type, a slip-clutch-type impositive connection between various operating members of the slack adjuster. This type of connection is undesirable because if any oil, grease or other foreign matter gets on the clutch surfaces, effective engagement of such clutch will be prevented and thus result in the slack adjuster failing to operate as intended. In slack adjusters of the above type it is also customary to employ a non-self-locking screw-thread connection between the two members (a pull rod and a tube) which constitute a link of adjustable effective length in the brake rigging. This is undesirable because if a part or parts of the slack adjuster become broken or for any other reason inoperative, there is a possibility that the effective length of said link may so increase that an inadequate braking force will be transmitted to the wheels or so decrease that the brake shoes will continually rub on the wheels.

It is therefore the principal object of this invention to provide an improved, relatively inexpensive, mechanically actuated double-acting slack adjuster embodying, in addition to a novel runner means and cam arrangement, a positive, preferably pawl-and-ratchet type, connection between the operating members and also embodying a self-locking screw-thread connection between the pull rod and tube, for assuring against the possibilities above described. For instance, with this improved arrangement, grease or foreign matter will not prevent proper operation of the operating members; and in the event of any malfunction of the slack adjuster, the length of the pull rod and tube will not be varied but will remain constant and thus provide a rigid link to assure a substantial degree of effective braking.

Figure 4B:
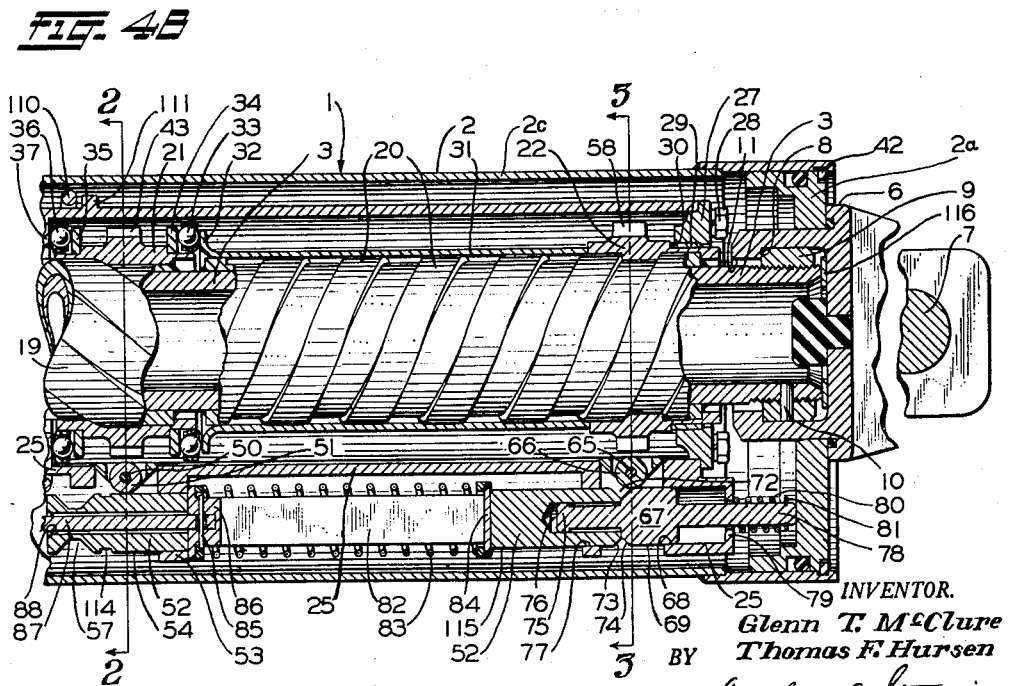

Other objects and advantages will become apparent from the following more detailed description of the invention and from the accompanying drawings, wherein:

Fig. 1 is a diagrammatic view of a railway car brake rigging with which is shown associated a slack adjuster device embodying the invention;

Figs. 2 and 3 are section views taken along the lines 2—2 and 3—3, respectively, of Fig. 1; and Figs. 4A and 4B, when taken together such that the right-hand edge of Fig. 4A is matched with the left-hand edge of Fig. 4B, constitute a longitudinal section view, taken along the lines 4—4 of Figs. 2 and 3 at the points indicated by the lines 2—2 and 3—3 on Fig. 4B, it being noted that for facility of understanding, certain components, which are shown in their true positions in Figs. 2 and 3, have been rotated somewhat in the showing of Fig. 4B.

Description

As shown in the drawings, a slack adjuster device 1 embodying the invention comprises a sectionalized, generally cylindrical, hollow, non-rotatable housing 2 which encircles a rotatable tube 3 that adjacent its one end is so connected to the housing as to be rotatable freely relative thereto but movable axially thereby. Adjacent its opposite end tube 3 has operative screw-threaded connection with an externally threaded pull rod 4 that is displaceable inwardly or outwardly of the tube according to whether said tube is rotated in one direction or the opposite direction.

The housing 2 is operatively connected to a live brake lever 5 such as through the medium of a clevis-providing member 6 having two complementary parts (only one of which is shown); and both of these parts are bolted or otherwise removably secured to one end 2a of the housing and carry a pin 7 whereby one end of the live lever 5 is pivotally connected to said member and thereby to said housing. Each of the parts of member 6 has a shoulder 8 which is engageable by the inner end of a bearing nut 9 that is screw-threaded onto the adjacent end of tube 3 and staked to said tube by a pin 10; and each of said parts also has a semi-circular surface 11 which joins said shoulder and encircles the tube with clearance to permit free rotation of the latter.

The external threads on pull rod 4 preferably mesh with an internally threaded nut 12 held in a fixed axial position in contact with a shoulder 13 within the tube 3 by a collar 14 that is screw-threaded into and overlies the outer end of the tube and has lugs 15 which project into circumferentially spaced slots in said nut for preventing rotation of the nut relative to the collar. The collar 14 is welded to the tube 3 so that the collar, nut 12 and tube will rotate as a unit. If desired, however, the external threads on the pull rod 4 may mesh directly with internal threads formed within the tube 3.

With the arrangement as thus far described, manual rotation of the tube 3 by application of a turning force to a wrench-engageable portion 16 of collar 14 (or an equivalent portion on the tube if no collar and nut are employed) or automatic rotation of the tube in the manner hereinafter described, will increase or decrease the distance between pin 7 and a pin 17 pivotally connecting the outer end of pull rod 4 to the upper end of a dead brake lever 18.

According to the invention, the external threads on pull rod 4 are of such pitch as to provide a self-locking screw-thread connection with the tube 3 (either directly, or indirectly via nut 12). Also, the tube 3 is provided, intermediate its ends, with two sets of oppositely wound, external threads 19, 20 preferably formed on separate tube-encircling sleeves that are welded to said tube in side-by-side relation; however, if desired, these threads may be formed on the exterior of the tube proper. The take-up threads 19 are preferably right-hand triple threads having a relatively long lead of such as about 7¼ inches, and the let-out threads 20 are preferably left-hand double threads with a substantially shorter lead of such as about 2½ inches. In any event, the take-up threads 19 and the threads on the pull rod 4 will be wound in the same direction; hence, since threads 19 are assumed to be right-hand threads, those on the pull rod will likewise be right-hand threads. A take-up ratchet nut 21 and let-out ratchet nut 22 have internal threads which mesh with the take-up threads 19 and let-out threads 20, respectively. These ratchet nuts 21, 22 are rotatable relative to, but movable axially by and with, a runner assemblage which encircles the tube 3.

This runner assemblage comprises: a sleeve 23 which has slidably guided contact with the wall of a bore through the other end 2b of housing 2 (nearest the pull rod 4) and is maintained concentrically spaced relative to the tube by a packing gland 24 pressed into said sleeve; a guide part 25 which at one end overlies and is secured, as by self-locking screw-threaded connection at 26, to the inner end of sleeve 23 and extends toward the member 6 radially outward of the ratchet nuts 21, 22, an end plate 27 secured by cap screws 28 to the opposite end of said guide part and retaining an annular thrust bearing 29 in contact with a shoulder 30 joined to a cylindrical surface adjacent the outer end of the let-out ratchet nut 22; a sleeve-like part 31 which abuts the inner end of the let-out ratchet nut 22 and extends along and radially outward of the let-out threads 20 and terminates in an inwardly directed flange 32 which engages one side of a caged ring of ball bearings 33; a thrust washer 34 which engages the opposite side of the ball bearings 33 and bears against a shoulder formed on the take-up ratchet nut 21 near the adjacent end thereof; a thrust washer 35 that bears against a shoulder formed on said take-up ratchet nut near the opposite end thereof and engages one side of a caged ring of ball bearings 36 which at their opposite sides bear against an inwardly directed flange 37 provided on part 25; and a boss 38 (Fig. 3) formed integrally with the outer wall of part 25 and having a radially extending bore for accommodating a pin 39 that carries a torque roller 40 which is rollable in a U-shaped longitudinally extending channel 41 welded to the inner wall of a cylindrical portion 2c of the housing 2, said roller serving to prevent rotation of the runner assemblage relative to the cylindrical housing portion 2c which is preferably detachably connected by a snap ring 42 to the end 2a of said housing.

The runner assemblage 23 to 40 is thus movable as a single unit axially but non-rotatably relative to the housing 2 and comprises thrust bearings 29, 33 and thrust bearings 33, 36 for respectively permitting the let-out ratchet nut 22 and the take-up ratchet nut 21 to spin freely on the tube 3 during axial movement of said runner assemblage except when such nuts are selectively rotatably locked to said runner assemblage in the manner now to be described.

As shown in Fig. 2, take-up ratchet nut 21 has a plurality of teeth 43 formed about its exterior and each having at opposite sides of the apex thereof a relatively long inclined tooth surface 44 and a relatively steep, substantially radial tooth surface 45 joined by a fillet to the surface 44 of an adjacent tooth. A bell crank lever 46 having two arms 47, 48 is rockably fulcrummed at its knee on a pin 49 that is carried by guide part 25 of the runner assemblage and has an axis parallel to the axis of tube 3. Suitably secured, as by a cotter pin, to bell crank lever arm 47 is a pin 50 which has an axis substantially perpendicular to the axis of pin 49 and carries in a slot in said arm a roller 51 that is adapted to engage a generally cylindrical cam member 52 having slidably guided contact with the wall of a bore (Fig. 4B) that extends through an outwardly directed flange 53 in runner part 25 and has an axis parallel with the axis of tube 3.

When roller 51 engages a cylindrical surface 54 of the cam member 52, the bell crank lever 46 will be rocked counterclockwise (Fig. 2) about pin 49 against resistance of a helical bias spring 55 (that acts against the outer side of arm 48 and seats against runner part 25) for withdrawing from the ratchet nut 21 a roller pawl 56 that is rollably carried at the outer end of arm 48. Hence under this condition, the nut 21 may spin freely in both directions on tube 3 and thus will not effect rotation of said tube during axial movement of the runner assemblage. However, when upon axial shifting of the cam member 52, the roller 51 is biased by action of spring 55 into a notch 57 (Fig. 4B) having bevelled sides formed in the cam member adjacent the cylindrical surface 54 thereof, pawl 56 will be swung into contact with the ratchet nut 21; whereupon counterclockwise rotation of the latter will be prevented by engagement of tooth surface 45 with said pawl but clockwise rotation of said ratchet nut will be possible by rolling of said pawl upwardly along the inclined tooth surfaces 44 and over the apexes of successive teeth 43.

As shown in Fig. 3, let-out ratchet nut 22 has a plurality of external teeth 58 each having at opposite sides of the apex thereof a relatively long inclined tooth surface 59 and a substantially radial tooth surface 60 joined by a fillet to the surface 59 of an adjacent tooth. A bell crank lever 61 having two arms 62, 63 is rockably fulcrumed at its knee on a pin 64 that is carried by part 25 of the runner assemblage and has an axis parallel to the axis of tube 3. Suitably secured, as by a cotter pin, to arm 62 is a pin 65 which has an axis substantially perpendicular to the axis of pin 64 and carries in a slot in said arm a roller 66; said roller being engageable with a cam member 67 that is slidably mounted in a bore 68 (Fig. 4B) of runner part 25 and movable axially relative to cam member 52.

When roller 66 engages a cylindrical surface 69 of member 67, the bell crank lever 61 will be rocked counterclockwise (Fig. 3) about pin 64 against resistance of a helical bias spring 70 (that acts against the outer side of arm 63 and seats against runner part 25) for withdrawing from the ratchet nut 22 a roller pawl 71 that is rollably carried at the outer end of arm 63. Hence, under this condition, the ratchet nut 22 may spin freely in both directions on the tube 3 and will not effect rotation of said tube during axial movement of the runner assemblage. However, when the roller 66 is permitted to drop by action of spring 70 into a widenable notch or gap 72 (Fig. 4B) defined between the relatively movable cam members 52 and 67, pawl 71 will be swung into contact with the ratchet nut 22; whereupon clockwise rotation of nut 22 will be prevented by engagement of tooth surface 60 with said pawl but counterclockwise rotation of said nut will be possible by rolling of said pawl upwardly along the inclined tooth surfaces 59 and over the apexes of successive teeth 58.

As shown in Fig. 4B, the sides of the widenable gap 72 are defined by the adjacent bevelled end 73 of cam member 52 and a bevelled shoulder 74 that is formed on cam member 67 and joins a reduced diameter shank portion 75 that projects slidably into a coaxially arranged bore-like recess 76 extending inwardly from said bevelled end 73 of member 52; said member 52 adjacent its bevelled end having slidably guided contact with the wall of a bore 77 in runner part 25. The member 67 has another reduced diameter shank portion 78 that is arranged coaxially with and opposite to portion 75 and projects through an end wall 79 of runner part 25. A helical spring 80 encircles portion 78 and bears against the outer side of end wall 79 and against a retaining ring 81 snapped onto the portion 78, for biasing cam member 67 to a normal position, in which it is shown, and which is defined by contact of the projecting end of portion 78 with the inner wall of end 2a of housing 2.

The cam member 52 has, intermediate its cylindrical surface 54 and the recess 76, a longitudinally extending vertical through slot 82. Encircling slot 82 is a helical bias spring 83 which at one end bears against a spring retaining washer that overlies the extremities of a pin 84 which is preferably non-rotatably (such as by having a square cross section) disposed within, and is operatively spring-pressed to one end of, the slot 82. Another spring-retaining washer, that overlies the extremities of a pin 85, is pressed by the other end of spring 83 into contact with a shoulder on a rectangular plate 86 that is disposed within slot 82 and is operatively spring-pressed into concurrent contact with both the other end of said slot and the flange 53 of runner part 25. Hence, spring 83 will normally be caged (that is, rendered ineffective) because it will normally bear at both ends against components that operatively contact portions of the cam member 52; said spring is uncaged only when said cam member tends to move leftward of the position in which it is shown, whereupon it will resist such movement and be effective to return said cam member to its shown position, for reasons hereinafter to be explained.

A changeover member 87 is provided which is preferably in the form of a shifter rod that extends into a recess in plate 86 and is staked to the latter by pin 85 and projects leftward from said recess through and exteriorly of a coaxially-arranged bore 88 provided in that part of cam member 52 which is encircled by surface 54 and notch 57. At its projecting end, changeover member 87 is adapted to abut a coaxially aligned adjustable screw 89 which is carried by, and projects inwardly through, end 2b of housing 2.

A collar-like member 90 is slipped over the outer end of runner sleeve 23 (that is, outwardly of housing end 2b) and abuts such as a band-type clamp 91 that is tightened about said sleeve by a bolt 92 and a nut (not shown); however, if preferred, a nut may be screwed onto the outer end of said sleeve for engagement by said member, for the same purpose as clamp 91, namely to prevent the member 90 from being shifted leftward off the end of the runner assemblage and provide an operative connection between the runner assemblage and a rod or tube 93, which is externally threaded adjacent its left-hand end and is screwed into a threaded bore that extends through collar 90 and has an axial parallel to that of tube 3. Tube 93 is adjustably positioned in a desired longitudinal position relative to collar 90 by a lock nut 94 and a lock washer 95.

As viewed in Fig. 1, tube 93 at its right-hand end is pivotally connected by a pin 96 to the upper end of a lever 97 that at its lower end is hingedly fulcrummed on a fixed member 98. Lever 18 and also levers 99, 100, 101 operatively carry at their lower ends respective brake shoes 102 engageable with the tread of corresponding wheels 103 to be braked. At their upper ends levers 99, 100 are hingedly fulcrummed on fixed member 98. Links 104 and 105 are pivotally connected to the levers 18, 99 and 100, 101, respectively, intermediate their ends. At its upper end lever 101 is pivotally connected to one end of a tie rod 106 that at its opposite end is pivotally connected to the same end of lever 97 as that to which tube 93 is hinge-connected. A link 107 is pivotally connected to the levers 97, 5 intermediate their ends; and a brake cylinder 108 has a piston rod 109 that is pivotally connected to the lower end of lever 5.

Operation

Assume initially that the brake cylinder 108 is devoid of fluid under pressure. Under this condition, the various parts will be in the respective positions in which they are shown in the drawings.

In the slack adjuster device 1, a power spring 110, which encircles runner sleeve 23 and bears against housing end 2b and an outwardly directed flange 111 on runner part 25, will bias the runner assemblage 23 to 40 to a rightward position, defined by contact of the right-hand end of packing gland 24 with a stop shoulder 112 on tube 3, it being noted that said gland is so pressed into the runner assemblage as to constantly abut a shoulder 113 on runner sleeve 23. Cam members 52 and 67 will be positioned by springs 83 and 80, respectively, in respective normal positions in which said cam members, through the medium of rollers 51, 66 and bell crank levers 46, 61, operatively hold pawls 56, 71 disengaged from the take-up ratchet nut 21 and the let-out ratchet nut 22, respectively. Thus, under the assumed condition, nuts 21 and 22 may rotate freely in both directions. Hence, whenever the brake cylinder 108 is vented, a wrench may be applied to portion 16 of collar 14 for so rotating tube 3 as to move the non-rotatable pull rod 4 inward or outward relative to said tube and thus manually take up or let out slack, respectively, in the brake rigging; it being apparent, from the showing in Fig. 1, that the various levers of the brake rigging are so interconnected that as the effective length of the screw-thread-connected pull rod 4 and tube 3 is reduced and increased, the normal slack in the rigging will be proportionately reduced and increased.

Assume now that pressure fluid is supplied to brake cylinder 108 for causing an application of brakes. As viewed in Fig. 1, brake cylinder piston rod 109 will move leftward and rock lever 5 clockwise relative to link 107 for moving clevis-providing member 6 and thus the housing 2 and also tube 3 (through bearing nut 9) rightward against the force of power spring 110; and at the same time, link 107 will be shifted somewhat leftward and rock lever 97 counterclockwise relative to fixed member 98 for shifting tube 93 leftward and thereby, through collar 90 and clamp 91, shifting the runner assemblage 23 to 40 leftward against the force of said power spring, which spring is thus being compressed from both ends. Meanwhile, tie rod 106 will be shifted leftward by lever 97 for causing lever 101, and through link 105, lever 100 to engage some of the brake shoes 102 with their associated wheels 103; and pull rod 4 will be pulled rightward by tube 3 for causing lever 18, and through link 104, lever 99 to engage the remaining brake shoes 102 with their associated wheels 103. Thus, the total distance that the rightwardly moving housing 2, tube 3 and pull rod 4 are shifted, during a brake application, relative to the leftwardly moving runner assemblage 23 to 40 will vary in direct proportion to the amount of slack in the brake rigging.

Referring now to Figs. 2, 3, 4A and 4B, as the runner assemblage 23 to 40 is shifted leftward relative to the rightwardly moving housing 2 and tube 3, during the initial phase of the brake application, spring 80 will shift cam member 67 rightward so as to tend to maintain contact of portion 78 of said cam member with end 2a of the housing, until runner end 79 is engaged by the large diameter portion of cam member 67. Thus, gap 72 will be widened and permit spring 70 to operatively, through bell crank lever 61, push roller 66 into said gap and at the same time swing pawl 71 into contact with let-out ratchet nut 22. After pawl 71 engages nut 22, the latter (which meanwhile has been spinning counterclockwise, as viewed in Fig. 3, in consequence of the leftward movement of the runner assemblage relative to tube 3) will continue to spin counterclockwise because said pawl will roll upwardly along surfaces 59 and over the apexes of successive teeth 58.

If slack in the brake rigging is insufficient, the travel of the brake cylinder piston rod 109 will be less than a desired minimum and will be insufficient to carry the changeover member 87 into abutting contact with screw 89. Consequently, when brake cylinder 108 is vented, the power stored in spring 110 (which has been compressed between housing end 2b and runner flange 111) will shift the housing 2 and tube 3 leftward and runner assemblage 23 to 40 rightward, as soon as tension in the rigging is reduced sufficiently. Since let-out pawl 71 is engaged with the let-out ratchet nut 22, the latter cannot rotate clockwise; and hence as the runner assemblage moves rightward relative to the leftwardly moving tube 3, said let-out nut will act through the let-out threads 20 to rotate said tube counterclockwise (as viewed in Fig. 3) and thus displace pull rod 4 outwardly of said tube to effect a let-out or increase in rigging slack until, toward the end of the brake release, cam member 67 (through contact of portion 78 with housing end 2a) is shifted leftward far enough to force roller 66 up along the bevelled shoulder 74 and onto the cylindrical surface 69 of said cam member; whereupon pawl 71 will be swung out of engagement with the ratchet nut 22.

Meanwhile, under the insufficient slack condition just described, spring 83 will remain caged and there will be no relative movement between cam member 52 and roller 51 during either the application or the release of brakes; and hence roller 51 will be maintained in contact with cam surface 54 and thus operatively maintain take-up pawl 56 disengaged from take-up ratchet nut 21, with the result that said nut will spin freely on the tube 3 during such application and release of brakes and exert no torque on said tube.

Thus, when brakes are completely released, the various parts will again be in the relative positions in which they are shown in the drawings, except that pull rod 4 will have been run a certain distance outwardly of tube 3 and thus increased the slack in the brake rigging.

If, however, during a brake application slack in the brake rigging is within desired limits, the travel of the brake cylinder piston rod 109 will be at least a desired minimum amount, but not exceed a desired maximum amount. This amount of travel of the brake cylinder piston rod 109 will be sufficient to carry the housing end 2b rightward and runner assemblage 23 to 40 leftward far enough to permit screw 89 to abuttingly contact changeover member 87 and, through such contact, shift said changeover member rightward relative to said runner assemblage for causing roller 51 and notch 57 to approach each other; it being noted that spring 83 will remain caged during, and hence offer no resistance to, such shifting of the changeover member. An annular groove 114 is preferably formed in the cam member 52 between cylindrical surface 54 and notch 57 and so disposed that when brake cylinder piston travel is at not quite the desired maximum roller 51 will drop into said groove, which will act as a detent groove to prevent vibration or momentum of the parts from undesirably shifting said roller into said notch. Meanwhile, with roller 51 in groove 114, the cam member 52 will have been shifted far enough rightward relative to the runner assemblage 23 to 40 and hence roller 66 as to have caused the latter to roll up on bevelled end 73 and onto a cylindrical surface 115 of member 52 for so rocking bell crank lever 61 counterclockwise about pin 64 as to effectively disengage pawl 71 from let-out nut 22; it being noted that the cam member 67 will then be in a rightmost position, defined by contact of the large diameter portion of member 67 with end wall 79, and that shank portion 78 will be spaced from housing end 2a.

Thus, when brake cylinder piston travel is between a desired minimum amount (corresponding to the least amount of travel necessary to force roller 66 up onto cam surface 115) and a desired maximum amount (corresponding to the maximum travel permissible without roller 51 dropping into notch 57), both pawls 71 and 56 will be concurrently disengaged by the time the brake shoes 102 frictionally engage their respective wheels 103. It will be apparent that the range between the desired minimum and maximum amounts of brake cylinder piston travel may be increased or decreased by relocating the notch 57 leftward or rightward, respectively, of the position in which it is shown.

Since both pawls 71 and 56 will be disengaged when brake cylinder piston travel is within the desired predetermined range, it will be apparent that upon venting of the brake cylinder 108, both nuts 22 and 21, respectively, will spin freely in opposite directions on their respective threads 20 and 19 and thus exert no torque on the tube 3 as the runner assemblage 23 to 40 is moved rightward and said tube and the housing 2 are moved leftward by the power of spring 110.

It will be noted that during this leftward movement of the housing 2, thrust will be transmitted therefrom to the tube 3 via a thrust bearing 116 carried by member 6 and bearing against the right-hand end of said tube. It will also be noted that as the changeover member 87 and screw 89 are carried away from each other, no force will initially be exerted on cam member 52 tending to shift it leftward relative to the runner assemblage because spring 83 is caged; and hence member 52 and the rollers 51, 66 will move rightward in unison and cause the pawls 56, 71 to be maintained disengaged until, by contact of portion 78 with housing end 2a, cam member 67 is shifted leftward far enough in bore 68 to successively close gap 72 and then contact bevelled end 73 of cam member 52. Through such contact, which will occur during the final phase of a brake release, cam member 52 will be driven leftward relative to the runner assemblage; and this will cause roller 66 to roll off surface 115 into the now closed gap 72 (which is now not deep enough to permit engagement of pawl 71 with nut 22) and thence up along shoulder 74 onto surface 69 for operatively effecting disengagement of pawl 71, and will also cause surface 54 of cam member 52 to move leftward relative to roller 51. The leftward movement of cam member 52 and hence of cam member 67 will cease when plate 86 contacts the flange 53, for any tendency of the cam member 52 to move further leftward, such as due to momentum, will be resisted by spring 83, which would become uncaged by such further leftward movement. Spring 83 also serves to maintain the cam member 52 in a fixed normal position, in which it is shown, despite any vibration which may occur while brakes are released.

Thus, when brakes are completely released, both pawls 56 and 71 will be concurrently disengaged and the parts will again be in the respective positions in which they are shown in the drawings. While brake cylinder piston rod travel is within the desired range, no increase or decrease in slack will occur during the brake application and release cycle because the pull rod 4 will not be displaced axially relative to the tube 3 during the release portion of such cycle.

Assuming now slack in the brake rigging is excessive, the brake cylinder piston rod 109 will have to travel beyond the desired range to effect engagement of the brake shoes 102. Hence, during a brake application, the change-over member 87 will engage the screw 89 and be shifted rightward relative to the leftwardly moving runner assemblage a greater distance than it is shifted when such travel is within the desired range, until the brake shoes 102 are engaged. As the changeover member 87 and hence cam member 52 move rightward this greater distance, roller 66 will roll up onto surface 115 for operatively disengaging the let-out pawl 71 from nut 22, as heretofore described, and then roller 51 will drop into notch 57 and permit take-up pawl 56 to be biased by spring 55 into engagement with ratchet nut 21. As soon as roller 51 drops into notch 57, rightward movement of cam member 52 will cease; but screw 89 through contact with changeover member 87 can, if necessary, shift the latter rightward relative to said cam member and against resistance of spring 83, which will now become uncaged. Thus, cam member 52 and changeover member 87 are resiliently interconnected by spring 83 so that they will normally move in unison, but under the condition just described the changeover member can move relative to the cam member so the latter can remain stationary in its slack take-up position in which roller 51 is disposed in notch 57. In other words, if the changeover member 87 were rigidly (rather than resiliently) connected to member 52, screw 89 acting through member 87 undesirably could shift the member 52 rightward far enough, under an excessive slack condition, to eject roller 51 from notch 57, in which case the adjuster would operate to neither let out nor take up slack, for both rollers 51, 66 would be concurrently ejected from their respective notches 57, 72. Meanwhile, as earlier described, when pawl 56 is engaged during leftward movement of the runner assemblage 23 to 40, nut 21 may continue to spin clockwise (Fig. 2) on the tube 3 because pawl 56 will roll up along successive tooth surfaces 44 and over apexes of successive teeth 43.

Consequently, when brake cylinder 108 is vented while take-up pawl 56 is engaged, take-up nut 21 will be prevented from rotating counterclockwise (Fig. 2) as the runner assemblage moves rightward; and hence nut 21, acting through the take-up threads 19, will cause tube 3 to rotate clockwise and thereby advance pull rod 4 into said tube for taking up slack in the rigging. It will be noted that spring 83 will be recaged, if necessary, as the screw 89 and member 87 move apart, and then, with said spring caged, the cam member 52 and runner assemblage 23 to 40 will move rightward in unison and thus cause pawl 56 to be maintained engaged for effecting take-up of slack until, during the final phase of the brake release, the cam member 67 (by contact of portion 78 with housing end 2a) is shifted leftward sufficiently to successively close gap 72 and then shift cam member 52 leftward (by contact with bevelled end 73) for forcing roller 51 out of notch 57 and thus operatively disengaging pawl 56 from nut 21. Thereafter, during continued leftward movement of the cam members 67, 52 relative to the runner assemblage 23 to 40, roller 66 will roll from surface 115 into the then closed gap 72 and then up onto surface 69, for continually maintaining the let-out pawl 71 disengaged from nut 21 during the release cycle. Thus, after pawl 56 is disengaged, the nuts 21, 22 will spin freely on the tube 3, without imparting any torque thereto, until the cam members 67, 52 are once again in their normal positions, in which they are shown.

Thus, after brakes have been released, all parts will be in the relative positions in which they are shown in the drawings, except that the length of the pull rod 4 projecting exteriorly of tube 3 will have been reduced and slack correspondingly reduced.

It is to be noted that the lead of the let-out threads 20 is relatively short, as herein proposed, because the torque required to rotate tube 3 to let out slack is relatively small and it is desirable to let out slack at a relatively fast rate and hence to a considerable degree during a single brake application and release cycle, so as to promptly increase slack to the normal amount after new brake shoes have been installed. The lead of the take-up threads 19 is relatively long, however, as herein proposed, because the torque required to rotate tube 3 to take slack is relatively high and the degree of slack take-up desired per operation is relatively small due to the relatively slow rate of brake shoe wear.

Since the external threads on the pull rod 4 are of such pitch as to provide a self-locking screw-threaded connection of the pull rod with the tube 3, it will be apparent that in the event of any malfunction of the slack adjuster device 1, the pull rod and tube will constitute a rigid link and thus assure a substantial degree of brake application. In other words, if there is a malfunction, the tube will not be able to spin relative to the pull rod and so reduce slack that the brake shoes will continually drag on the wheels or so increase slack that the brake cylinder piston will reach the end of its stroke before the brake shoes have effectively engaged the wheels.

Also, with the improved slack adjuster device 1, the pawls 56, 71 will positively engage and lock the ratchet nuts 21, 22, respectively, against rotation during a brake release for positively assuring that the tube 3 will be rotated in a slack-reducing or slack-increasing direction, according to which of these pawls is selectively engaged. Grease or other foreign matter will not impair the proper operation of these positive-acting parts, such as can occur in those slack adjusters employing slip-type clutch arrangements.

Having now described the invention, what we claim as new and desire to secure by Letters Patent is:

1. For adjusting slack in a rigging, an automatic slack adjuster device comprising non-rotatable housing means, tube means rotatable relative to and movable axially by and with said housing means, a non-rotatable pull rod having operative self-locking screw-threaded connection with said tube means so as to be moved linearly into and out of said tube means according to the direction of rotation of the latter so as to correspondingly vary slack, a pair of rotatable ratchet nuts each screw-threaded onto a respective set of oppositely wound external non-self-locking threads provided on said tube means and each having ratchet teeth, a pair of pawls each selected effectively engageable with the teeth of a corresponding one of said ratchet nuts during untensioning of the rigging, the teeth of the respective nuts being of such configuration that if the corresponding pawl contacts same during tensioning of the rigging such pawl will ratchet over such teeth and permit free spinning of such unit on its corresponding set of such threads, non-rotatable runner means disposed within said housing means, means providing a thrust connection between said runner means and nuts to cause the latter to be moved longitudinally with said runner means while permitting rotation of said nuts on said tube means, a pair of lever means each hingedly carried by said runner means and carrying a corresponding one of said pawls and biased to a pawl-engaging position, cam means operatively engaged by said lever means and longitudinally shiftable relative to said runner means by operative contact with said housing means for operatively through their respective lever means controlling engagement and disengagement of said pawls, and power spring means for biasing said housing means and runner means relatively toward each other when the rigging is untensioned, said housing means and runner means being operatively connected to different parts of the rigging to cause said housing means and tube means and pull rod to move in unison longitudinally in one direction and said runner means to move in the opposite direction during tensioning of the rigging and against the force of said power spring means a total distance corresponding to the existing slack condition to correspondingly control the position of said cam means relative to said runner means, such that when said total distance is less than or exceeds a desired amount corresponding to a desired slack, said cam means during tensioning of the rigging will be positioned relative to said runner means to respectively permit effective engagement of one or the other of said pawls with the corresponding ratchet teeth upon untensioning of the rigging, and with said one or said other pawl thus effectively engaged its corresponding ratchet nut will be rotatably locked to said runner means and compel said tube means to rotate in a slack-increasing direction or in a slack-decreasing direction, respectively, during movement of said runner means and housing means toward each other by said power spring means during such untensioning of the rigging.

2. The combination according to claim 1, wherein said cam means is operative when said total distance is substantially said desired amount during tensioning of the rigging to assume a certain position relative to said runner means and in which it operatively effects concurrent disengagement of both of said pawls from their corresponding ratchet nuts to cause both of said pawls to spin freely on their respective ratchet nuts and effect no change in slack during subsequent untensioning of the rigging.

3. The combination according to claim 1, wherein each of said hingedly carried lever means is a bell crank lever rockably carried at its knee on a pin carried by the runner means and having an axis parallel to that of said tube means, and each of said levers carries at one end a corresponding one of said pair of pawls and carries near the opposite end a roller engageable with said cam means, and wherein each of said bell crank levers is spring biased to the pawl-engaging position.

4. The combination according to claim 1, wherein said cam means comprises two coaxially arranged cam members provided with abuttable surfaces for limiting the degree of movement of said cam members toward each other, and including bias means for biasing one of said cam members in said one direction into operative contact with the inner wall of one end of said housing means, other spring means normally caged by operative contact at both ends with the other of said cam members and uncaged by operative contact with said runner means for biasing said other cam member in said one direction relative to said runner means to a normal position only when said other cam member tends to move in said opposite direction beyond its normal position, and means carried by the other end of said housing means for operatively engaging and shifting said other cam member in said one direction relative to said runner means only when said total distance is equal to or exceeds said desired amount, such that during untensioning of the rigging said one cam member will be shifted in said opposite direction by operative contact with said inner wall to a normal position, in which it operatively holds said one pawl disengaged, and such that during untensioning of the rigging said other cam member if it had previously been shifted from its normal position, in which it operatively holds said other pawl disengaged, will be shifted in said opposite direction back to its normal position by said one cam member through contact of said abuttable surfaces, whereby with the rigging completely untensioned both of said pawls will be disengaged to permit slack to be manually adjusted by manual rotation of said tube means.

5. The combination according to claim 4, wherein said one cam member has a bevelled surface joining its abuttable surface so as to provide a bevelled gap which is widenable and closable by movement of said cam members away from and toward each other, respectively, said gap being widened upon movement of said one cam member in said one direction by said bias means during the initial phase of tensioning of the rigging for causing the lever means associated with said one pawl to drop into said gap and effect engagement of said one pawl with its corresponding ratchet nut for normally conditioning the slack adjuster to increase slack, the teeth of the last-mentioned ratchet nut being of such configuration as to permit the latter to rotate on said tube means by ratcheting of said one pawl over such teeth only during movement of said runner means in said opposite direction during tensioning of the rigging and to lock said last-mentioned ratchet nut against rotation if said one pawl is engaged during untensioning of the rigging, said gap being closed during the final phase of a untensioning of the rigging for swinging said associated lever means to effect disengagement of said one pawl.

6. The combination according to claim 4, wherein said cam members have bevelled surfaces joining their abuttable surfaces and also joining respective cylindrical surfaces so as to provide a bevelled gap which is widenable and closable by movement of said cam members away from and toward each other respectively, said gap being widened by movement of said one cam member in said one direction relative to said other cam member during the initial phase of tensioning of the rigging for causing the lever means associated with said one pawl to be moved off the cylindrical surface of said one cam member and drop into said widened gap and thus effect engagement of said one pawl for normally conditioning the slack adjuster to increase slack, said ratchet nuts each having teeth of such configuration as to permit spinning of such ratchet nut on the tube means if and when the corresponding pawl should be engaged during tensioning of the rigging, but prevent such spinning and effect rotation of said tube means if the corresponding pawl should be engaged during untensioning of the rigging, said other cam member being operatively shifted by said housing means toward said one cam member only when said total distance is at least equal to said desired amount for thereby causing the lever means associated with said one pawl to be moved up into the cylindrical surface of said other cam member and thus effect disengagement of said one pawl, the extent of such last-mentioned shifting being sufficient, provided said desired amount is exceeded, to also cause the lever means associated with the other pawl to be moved off another cylindrical surface and into a bevelled notch provided in said other cam member for thereby effecting engagement in said other pawl, such that if said desired amount has been exceeded said one pawl will be disengaged and said other untensioning will be effectively engaged during release of the rigging for causing rotation of said tube means in its said slack-reducing direction.

7. The combination according to claim 6, including a detent groove provided on said other cam member intermediate its said other cylindrical surface and said notch for offering a slight resistance to movement into said notch of the lever means associated with said other pawl so that said other cam member will not be so shifted by momentum or vibration as to cause the last-mentioned lever means to drop into said notch and thus effect engagement of said other pawl when said total distance is at substantially said desired amount.

8. For varying slack in a rigging, a slack adjuster device comprising a rotatable tube means and a non-rotatable rod which are operatively connected to each other by self-locking screw threads and constitute a link of adjustable effective length in the rigging, a let-out nut and a take-up nut each screw-threaded onto a respective set of oppositely wound external non-self-locking threads provided on said tube means and each having ratchet teeth, a non-rotatable housing and a non-rotatable runner means each connected to different parts of the rigging and movable relatively away from each other during tensioning of the rigging, a power spring biasing said housing and runner means relatively toward each other during untensioning of the rigging, means providing a thrust connection between said runner means and said nuts to cause said nuts to be moved longitudinally with said runner means while permitting rotation of said nuts relative to the runner means, a let-out pawl and a take-up pawl operatively biased toward the teeth on the said let-out nut and said take-up nut, respectively, the teeth of the said nuts being of such configuration that if either of said pawls contacts the corresponding teeth during tensioning of the rigging such pawl will ratchet over such teeth but upon untensioning of the rigging will effectively engage such teeth to prevent rotation of the corresponding nut and thus compel the tube means to rotate in a slack-increasing direction or in a slack-reducing direction according to whether the take-up pawl or let-out pawl is then effectively engaged, two longitudinally spaced levers each rockably carried by the runner means and each carrying a respective one of said pawls, and cam means comprising two members resiliently biased apart and longitudinally shiftable relative to said runner means and controlling engagement and disengagement of said pawls by controlling rockable movement of their respective levers, one of said members being shifted in one direction toward the other member by operative contact with one end of said housing to operatively through one of said levers effect disengagement of the let-out pawl when the rigging is completely untensioned and biased in the opposite direction into contact with said runner means as said housing moves in said opposite direction during the initial phase of tensioning of the rigging to permit said let-out pawl to be carried by said one lever into contact with the let-out nut teeth, said other member normally through the other lever operatively maintaining said take-up pawl disengaged and being shifted in said opposite direction by operative contact with the other end of said housing to cause said let-out pawl to be disengaged by said one lever from the let-out nut teeth and also permit said take-up pawl to be carried by said other lever into contact with the take-up nut teeth only if said housing is moved more than a predetermined amount corresponding to a desired slack condition in said opposite direction during tensioning of the rigging, whereby during untensioning of the rigging of the let-out pawl or take-up pawl will be selectively effectively engaged according to whether during the preceding tensioning of the rigging said housing had been moved less than or more than said predetermined amount in said opposite direction.

9. A slack adjuster device as claimed in claim 8, further characterized in that the said sets of oppositely wound external non-self-locking threads provided on said tube means are of different leads respectively.

10. A slack adjuster device as claimed in claim 8, further characterized in that the one set of non-self-locking threads on which the let-out nut is screw-threaded has a smaller lead than does the other set of non-self-locking threads on which the take-up nut is screw threaded, thereby to cause let-out of slack to be effected at a rate faster than take-up of slack is effected.

No references cited.

UNITED STATES PATENT OFFICE
CERTIFICATION OF CORRECTION

March 7, 1961

Patent No. 2,973,841

Glenn T. McClure et al.

It is hereby certified that error appears in the above numbered patent requiring correction and that the said Letters Patent should read as corrected below.

Column 12, line 15, for "untensioning" read -- pawl --; line 16, for "release" read -- untensioning --.

Signed and sealed this 25th day of July 1961.

(SEAL)
Attest:

ERNEST W. SWIDER
Attesting Officer

DAVID L. LADD
Commissioner of Patents